C. N. RAND.
Metal-Post for Wire-Fences.
No. 202,468. Patented April 16, 1878.
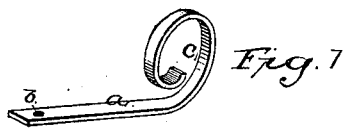
Fig. 1.
Fig. 2.
Fig. 3.
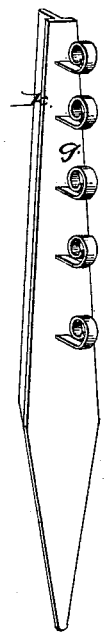
Fig. 4.
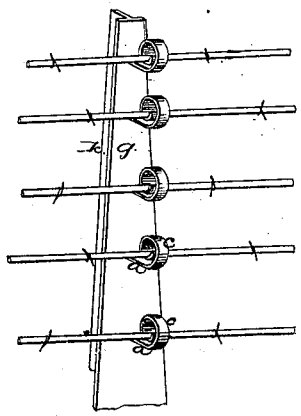
Attest:
J. H. Lewis
Arthur Stimson
Inventor.
Charles N. Rand
by Thomas G. Orwig
att'y.
N. PETERS, PHOTO-LITHOGRAPHER, WASHINGTON, D. C.

UNITED STATES PATENT OFFICE.

CHARLES N. RAND, OF CEDAR RAPIDS, IOWA, ASSIGNOR OF ONE-HALF HIS RIGHT TO J. T. KIGGENS.

IMPROVEMENT IN METAL POSTS FOR WIRE FENCES.

Specification forming part of Letters Patent No. 202,468, dated April 16, 1878; application filed June 11, 1877.

*To all whom it may concern:*

Be it known that I, CHARLES N. RAND, of Cedar Rapids, in the county of Linn and State of Iowa, have invented an Improved Fence-Post, of which the following is a specification:

The object of my invention is to furnish light, strong, and durable iron posts, specially adapted for making wire fences.

It consists in the manner of forming a series of wire holding and fastening devices complete in themselves, and then combining them with a wrought-iron rod by casting iron around the rod to form a complete post.

Figure 1 of my drawing is a perspective view of my wire-fastening device. $a$ represents a short, flat, and tapering bar of malleable iron, having a perforation, $b$, at one end, and an open eye, $c$, at the other end, formed by simply bending and curling the small tapering end to adapt it to receive a fence-wire.

Fig. 2 is a perspective view of a straight wrought-iron rod, $d$, preferably round, upon which is placed a series of my wire-holding devices, $a\ b\ c$, by simply passing the rod through their perforations $b$. The wire-fastenings, thus combined with the rod, may vary in number, as desired, and can be adjusted upon and fastened to the rod in any way desired. By having the rod $d$ made to fit and fill the perforations $b$, the wire-fastening devices will remain upon the rod in any position placed, secure enough for the purpose of placing the combined rod and fastenings in the sand and mold to have iron cast around them to form a complete solid iron post.

Fig. 3 is a perspective view of my complete post, having a series of wire-fastening devices, $a\ b\ c$, formed integral therewith, and projecting therefrom at right angles. $g$ represents the face of the post from which the wire-fastening devices $a\ b\ c$ project. $k$ represents a rib or flange. The cast-iron body of the post formed around the re-enforcing and strengthening wrought-metal rod $d$ is tapering at both ends. It may vary in size, weight, and form as desired, but is preferably of angular, flanged, and tapering shape, as shown.

Fig. 4 is a perspective view of a section of a barbed-wire fence, and illustrates the manner of using my complete invention.

After the posts are set in the ground, the wires are stretched along the row and slipped into the open eyes $c$ of the fastenings. The eyes $c$ may then be pressed shut to clamp the wires, if desired, but not necessarily so, because the wires cannot readily escape from their bearings when properly introduced.

I am aware that wrought-iron rods have been embedded in metal castings of various shapes and for various purposes; but I claim that my manner of forming a wire-holding post complete in one piece, by casting metal around the rod $d$, having a series of wire-fastening devices, $a\ b\ c$, is novel and greatly advantageous.

I am also aware that malleable wire-holding ears or clips have been combined with an iron fence-post. My manner, however, of forming malleable wire-holding devices with perforations in one end and an open eye in the other end, and then placing them in proper positions upon a wrought-metal rod to have the body of a metal post cast around the rod and the rear ends of the wire-holding devices, to conceal them, and also to fix them rigidly in a rigid post, produces an improved article of manufacture that is valuable in the construction and use of wire fences.

I claim as my invention—

1. The foregoing-described method of forming a post adapted for wire-fences—to wit, making flexible wire-fastening devices $a\ b\ c$, and placing them on a wrought-iron rod or bar, $d$, and then casting iron around said rod to form a complete rigid post, substantially as shown and described, and for the purposes set forth.

2. A wire-holding fence-post composed of the series of wire-fastening devices $a\ b\ c$, the re-enforcing wrought-metal rod $d$, and the cast-iron body $g\ k$, in the manner and for the purposes set forth.

CHARLES N. RAND.

Witnesses:
J. T. KIGGENS,
J. S. ANDERSON.